June 11, 1963  E. C. WESTERFIELD  3,093,796
AUTOMATIC SIGNAL TIME COMPRESSOR WITH GATE
MEANS FOR CONTROLLING RATE OF SHIFT
REGISTER OUTPUT
Filed Oct. 28, 1959
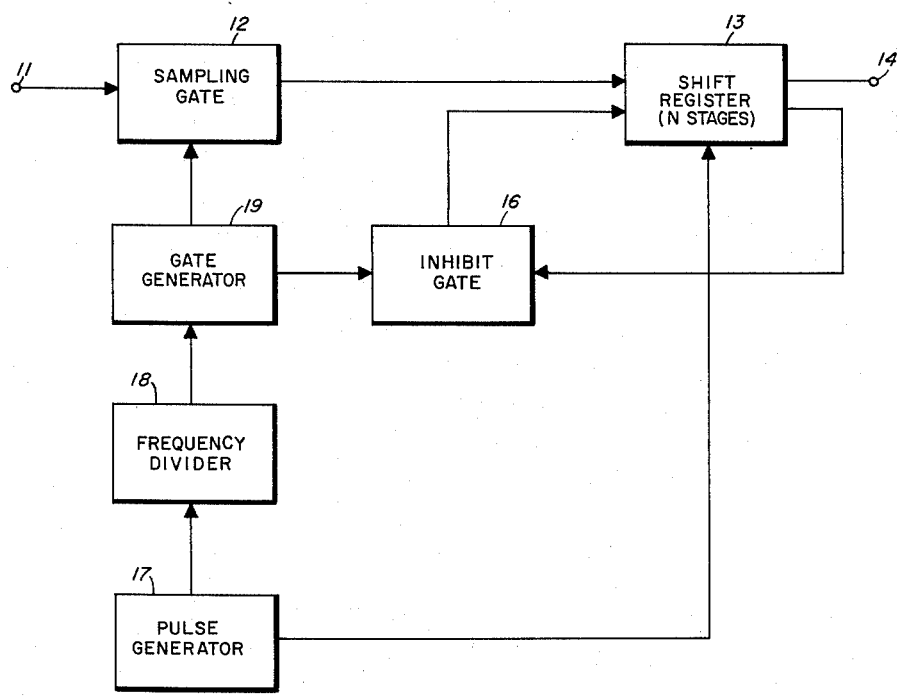
INVENTOR.
EVERETT C. WESTERFIELD
BY
ATTORNEYS 3,093,796
Patented June 11, 1963

3,093,796
AUTOMATIC SIGNAL TIME COMPRESSOR WITH GATE MEANS FOR CONTROLLING RATE OF SHIFT REGISTER OUTPUT

Everett C. Westerfield, San Diego, Calif., assignor to the United States of America as represented by the Secretary of the Navy
Filed Oct. 28, 1959, Ser. No. 849,418
4 Claims. (Cl. 328—15)
(Granted under Title 35, U.S. Code (1952), sec. 266)

The invention described herein may be manufactured and used by or for the Government of the United States of America for governmental purposes without the payment of any royalties thereon or therefor.

This invention relates to an automatic signal time compressor and more particularly to an automatic recycling signal time compressor utilizing a binary shift register.

The most common prior art method of time compressing signals consisted of recording the signal on a suitable recording device at a low speed and playing the signal back at a higher speed. Another prior art method consisted in converting signal samples to pulses of high frequency sound which were then circulated through a quartz delay line at a high rate, the second pulse being introduced behind the first after the first pulse had circulated through the delay line once, etc. The first method being mechanical suffered from the usual limitations of mechanical systems and disadvantages inherent in recording systems such as inflexibility. The second method suffered from the well-known problems of converting electrical energy to sound and back again. It also encountered the problem of accurately synchronizing the pulses at high conversion rates.

It is thus an object of the present invention to provide an automatic recycling signal time compressor which is completely electronic and requires no moving parts.

Another object is the provision of an automatic recycling signal time compressor in which energy conversion from mechanical to electrical is not utilized.

Still another object is to provide an automatic recycling signal time compressor which is completely flexible in the compression factor.

Still another object is to provide an automatic recycling signal time compressor in which the order of signals can be reversed or scrambled in relationship to the input signal.

According to the invention the binary signal to be compressed in time is passed through a gating circuit to the input of a shift register having N stages. The gating circuit is gated at a predetermined rate which in turn passes the input signal to the shift register input. The shift register is shifted at a predetermined multiple of the rate at which the sampling circuit is gated. In one preferable mode, the shift register is shifted at $(N+1)$ times the rate at which the shift circuit is gated. This is accomplished by setting up the gating pulse generator at the desired shift rate and dividing the output pulse rate of this generator by a factor of $N+1$, utilizing the output of the divider as the gating signal to the input gating circuit. The output of the shift register is then fed back to the input through an inhibit gate. Also coupled to the inhibit gate is a signal in time coincidence with the input gating circuit gating signal. This prevents the output from the shift register being fed back to the input during periods when the input signal is being sampled through the input gate to the shift register input. The output sample rate in this particular mode will then be $(N+1)$ times the input sample rate or the compression factor will be $N+1$. If the shift pulse generator is divided by a factor of $N-1$ and the pulse is sampled at this lower rate the output will then yield $(N-1)$ pulses for every input signal sampled, but in the reverse order, as will be further explained. If any other odd division is utilized from the shift pulse generator to the input gate generator the output will yield a signal compressed in time by the dividing factor but may now be in a scrambled order. For this reason the $N+1$ or the $N-1$ dividing factors are most commonly utilized. If the dividing factor utilized is $AN+1$, the same order will be maintained, but the coefficient "A" will be part of the compression factor. This is assuming that "A" is an integer, i.e. a whole number. If "A" should be a fraction such as ½ and the number of shift register stages is divisible by 2, i.e., even, the output sequence will be the odd signals first in order followed by the even signals in order. The compression ratio would in this case be $$\frac{N}{2}+1$$

Likewise in order, if the number of stages in the shift register is divisible by 3, and the dividing factor from the shift pulse generator to the input-sampling gate is $$\frac{N}{3}+1$$

the output would yield the input signal compressed in time by a factor $$\frac{N}{3}+1$$

but the order would be changed to yield the first the signals that are multiples of 3 minus 2, i.e., the 1st, 4th, 7th, etc., then the signals which are multiples of 3 minus 1, 2, 5, 8, etc., and finally the signals that are exact multiples of 3, i.e., 3, 6, 9, 12. The same principle would hold true if $$\left(\frac{N}{4}+1\right)$$

were used etc. Thus the shortcomings of the prior art have been overcome in that a completely electronic system without energy conversion has been devised, which affords complete flexibility in both sample order, sampling rate and compression factor.

Other objects and many of the attendant advantages of this invention will be readily appreciated as the same becomes better understood by reference to the following detailed description when considered in connection with the accompanying drawings wherein:

The sole FIGURE shows a system block diagram of a preferred embodiment of the invention.

Referring to the drawing, input terminal 11 is connected to the input of sampling gate 12, the output of which is applied to shift register 13. The output of shift register 13 is applied to output terminal 14 and an input of inhibit gate 16, the output of which is coupled to the input of shift register 13. Pulse generator 17 is coupled to shift register 13 and frequency divider 18. The output of frequency divider 18 is coupled to gate generator 19, the outputs of which are coupled to sampling gate 12 and inhibit gate 16.

Operations

The binary signals to be processed are applied to input terminal 11 and passed through sampling gate 12 to the input of the shift register 13. The simplest operation and probably the most common will be the "$N+1$" mode so that will be described first. The frequency of the gate pulse generator 19 will be dependent upon the number of samples required in a given period to adequately represent the input signals, i.e., the minimum number would be 1 sample per bit if a ibnary code were used. The sampling rate R then, having been determined, will determine the minimum frequency at which the shift pulse generator 17 can be operated, i.e., in the "N+1" mode the sampling rate R will be multiplied by (N+1) thus R(N+1) will be the frequency at which pulse generator operates, and, of course, the frequency at which shift register 13 is shifted. Thus, divider 18 must divide the pulse generator frequency by (N+1). The output of divider 18 will then be a series of pulses at a rate R which triggers gate generator 19, which in turn gates sampling gate 12 and samples the incoming signals at terminal 11 at a rate R. Each sample will then be shifted through (N+1) stages before the succeeding sample from sampling gate 12 enters the register 13. This puts the first sample (N+1) stages ahead of the second sample and since the output of the shift register is fed back into the input via inhibit gate 16 the first sample will be in the number two position of shift register 13 when the second sample enters the number one position. The proper sequence for the samples is thus maintained in the "N+1" mode. At the time the sampling gate passes a sample of the incoming signal, the inhibit gate 16 is cut off by another output from gate generator 19, which prevents a confusion of signals at the input of shift register 13. After T seconds, the shift register will be full and when the (N+1)th sample is introduced it will displace the first sample.

$$\left(\frac{T}{N+1}\right)$$

seconds later the second sample will be replaced by the (N+2)th sample, etc. The output of the shift register will thus in any interval of duration $$\left(\frac{T}{N+1}\right)$$

seconds consist of the samples from the signal received in the preceding T seconds. All samples will thus be stepped up in the ratio $$\frac{N+1}{1}$$

and be in the original input order. Another way of stating this is that the output in the interval between input samples will then be the last (N+1) samples. It can easily be seen from the foregoing analysis of the "N+1" mode that were the dividing factor (N+1) changed to the factor (AN+1), the result would be that the compression factor would no longer be (N+1) but (AN+1) and the order would be the same provided A is a whole number.

The "N−1" mode is identical to the "N+1" mode with the exception that the shift register will fill up in reverse, i.e., the first signal will end up behind the second signal which in turn will end up behind the third signal, etc. Thus the output will yield a signal compressed by the factor (N−1) and in the reverse order of the input, i.e., the latest (N−1) samples will be present at the output in a period of one signal sample but reversed in sequence.

In the case of a fractional exponent, i.e., where A equals ½, ⅓, ¼, etc., the incoming signal is still compressed by a factor of (AN+1), but the order or sequence is changed to another definite order provided that the stages in the shift register N is divisible by the denominator of A, i.e., in the case of where A is ½, N must be an even number, in the case where A is ⅓, N must be a multiple of three or divisible by three, etc. In the case of the $$\text{``}\frac{N}{2}+1\text{''}$$

mode, the multiples of 2−1 appear at the output followed by the multiples of 2, i.e., the 1st, 3rd, 5th, 7th, etc. input signal is followed by the 2nd, 4th, 6th, 8th, etc. input signal. In the case where A equals ⅓ the multiples of 3 minus 2 appear first, then multiples of 3 minus 1 and then multiples of 3, i.e., the 1st, 4th, 7th, 10th, etc. followed by the 2nd, 5th, 8th, 11th, etc. and finally followed by the 3rd, 6th, 9th, 12th, etc. Signals would appear in that order at the output, again, compressed by (AN+1) or in this case $$\frac{N}{3}+1$$

If A is not a whole number the output will still be compressed by the factor AN+1 but will not follow the original order. This of course can be useful when, in the case of binary signals 1 and zero, the output is only to be averaged or integrated. Obviously, the frequency divider 18 must divide by greater than one or no compression would take place.

The shift register can be any of the well-known commercially available electronic or magnetic shift registers. The inherent limitations of the particular shift register utilized will of course limit the automatic recycling signal time compressor accordingly, i.e., the electronic shift registers are capable of faster shift rate than magnetic systems at the present time. Since digital shift registers are conventional and well known in the signal processing and computing arts and do not in themselves form a part of the present invention, shift register 13 has merely been indicated as a single block.

It is to be understood further that the remaining blocks being well known and conventional in the electronics and computing arts have not been broken down in schematic form. Pulse generators, frequency dividers, gate generators, and sampling gates are all well known and conventional in the electronics arts.

Obviously many modifications and variations of the present invention are possible in the light of the above teachings. It is therefore to be understood that within the scope of the appended claims the invention may be practiced otherwise than as specifically described.

What is claimed is:

1. An automatic signal time compressor comprising; sampling means having inputs and at least one output adapted to sample a binary signal at a predetermined rate; circulating storage means consisting of an N-stage shift register and having inputs and outputs, one input on said storage means being connected to an output of said sampling means; inhibit means having inputs and at least one output; gate pulse generator means for producing gating pulses at a predetermined rate and having at least one input and outputs, one of said outputs being operatively connected to an input of said sampling means and another of said outputs from said gate pulse generator means being operatively coupled to an input on said inhibit means; an output of said circulating storage means being operatively connected to an input on said inhibit means, the output of said inhibit means being operatively connected to an input of said circulating storage means; said inhibit means being operable to couple the output of said circulating storage means to said input of said circulating storage means in the absence of an input from said gate generator means; shift pulse producing means operatively connected to an input of said circulating storage means adapted to shift said circulating storage means at a rate which is a predetermined multiple, higher than one, of said predetermined gating pulse rate.

2. An automatic signal time compressor as set forth in claim 1 wherein; said predetermined multiple is AN+1; and A is a whole number.

3. An automatic signal time compressor as set forth in claim 1 wherein; said predetermined multiple is AN−1; and A is a whole number.

4. An automatic signal time compressor comprising a shift register containing N stages, pulse generating means having inputs and outputs and generating $$A(AN+1)$$

pulses per unit time, where the product AN yields a whole number and R is a predetermined sampling rate, a first output of said pulse generating means connected as a shifting means to said shift register, a frequency dividing means, said frequency dividing means having inputs and outputs, a second output of said pulse generating means connected to the input of said frequency dividing means, said frequency dividing means yielding one output pulse for every $AN+1$ input pulse, gate generating means connected to the output of said frequency dividing means, said gate generating means having inputs and outputs, the output of said gate generating means yielding an output gate pulse for each input pulse, a sampling gate, said sampling gate having inputs and outputs, a first output of said gate generating means connected to a first input of said sampling gate, an inhibit gate, said inhibit gate having inputs and outputs, a second output of said gate generating means connected to a first input of said inhibit gate, the output of said shift register connected to a second input of said inhibit gate, the outputs of said sampling and inhibit gates connected to the input of said shift register, so that a binary signal applied to a second input of said sampling gate will appear at the output of said shift register time compressed in the ratio $AN+1$ to 1.

References Cited in the file of this patent

UNITED STATES PATENTS 2,909,601     Fleckenstein et al          Oct. 20, 1959